Feb. 28, 1956 NICHOLAS CHRISTOFILOS (OR PHILOS) 2,736,799

FOCUSSING SYSTEM FOR IONS AND ELECTRONS

Filed March 10, 1950 4 Sheets-Sheet 1

INVENTOR

NICHOLAS CHRISTOFILOS (OR PHILOS)

BY Wenderoth, Lind & Ponack

ATTORNEYS

Feb. 28, 1956 2,736,799
NICHOLAS CHRISTOFILOS (OR PHILOS)
FOCUSSING SYSTEM FOR IONS AND ELECTRONS
Filed March 10, 1950 4 Sheets-Sheet 2
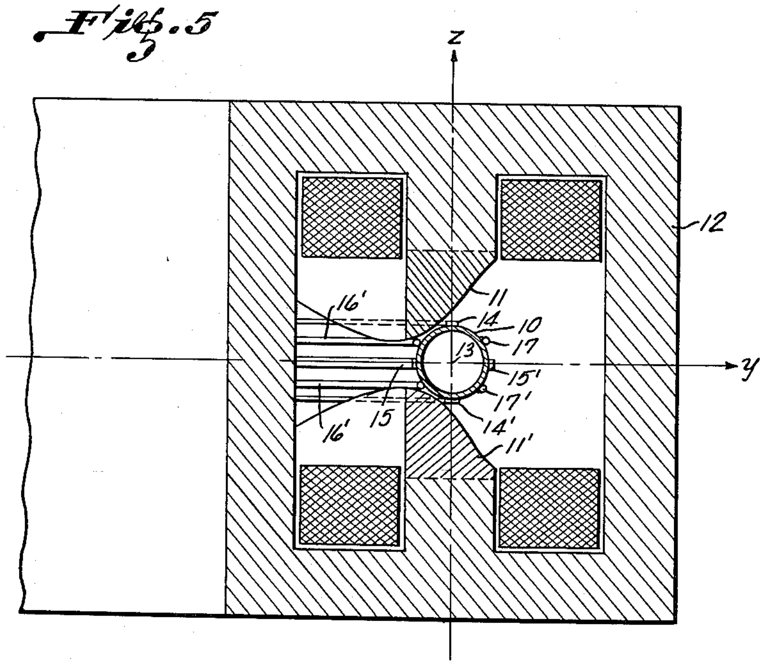
Fig. 6
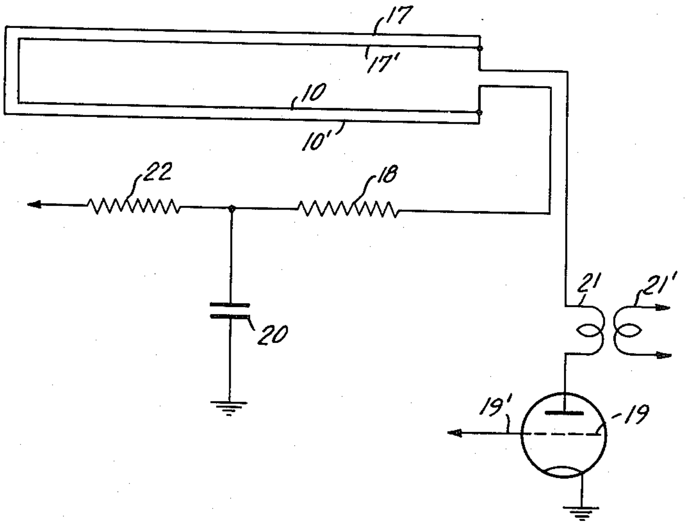
INVENTOR
NICHOLAS CHRISTOFILOS (OR PHILOS)
BY Wenderoth, Lind & Ponack
ATTORNEYS Feb. 28, 1956 NICHOLAS CHRISTOFILOS (OR PHILOS) 2,736,799

FOCUSSING SYSTEM FOR IONS AND ELECTRONS

Filed March 10, 1950 4 Sheets-Sheet 3

INVENTOR
NICHOLAS CHRISTOFILOS (OR PHILOS)

BY Wenderoth, Lind & Ponack
ATTORNEYS

Feb. 28, 1956 NICHOLAS CHRISTOFILOS (OR PHILOS) 2,736,799

FOCUSSING SYSTEM FOR IONS AND ELECTRONS

Filed March 10, 1950 4 Sheets-Sheet 4

INVENTOR
NICHOLAS CHRISTOFILOS (OR PHILOS)

BY Wenderoth, Lind & Ponack
ATTORNEYS

United States Patent Office 2,736,799

Patented Feb. 28, 1956

2,736,799

FOCUSSING SYSTEM FOR IONS AND ELECTRONS

Nicholas Christofilos (or Philos), Athens, Greece

Application March 10, 1950, Serial No. 148,920

8 Claims. (Cl. 250—27)

The present invention relates to a new focussing system for ions and electrons and application thereof in particle accelerators.

A major problem in the design of particle accelerators is the provision of suitable means for focussing the accelerated particles towards a predetermined orbit and compensating the mutual electrostatic repulsive forces.

An ideal focussing system must accelerate the moving particles towards a predetermined orbit from all directions and the focussing forces must increase as the distance from said orbit increases.

If we consider an orthogonal coordinate system, $x, y, z$, and suppose that the particle's orbit coincides with the $x$-axis and considering as $P_x$, $P_y$, $P_z$ the $x, y, z$, components of the focussing forces, then, in an ideal focussing system the equations of the $P_x$, $P_y$, $P_z$ would be $$P_x=0 \quad (1)$$

$$P_y=-\epsilon_y.y \quad (1a)$$

$$P_z=-\epsilon_z.z \quad (1b)$$

But simultaneously the Laplace equation $\Delta\varphi=0$ must be satisfied so that it must be $$\frac{\delta P_x}{\delta x}+\frac{\delta P_y}{\delta y}+\frac{\delta P_z}{\delta z}=0 \quad (1c)$$

or $$\epsilon_y=-\epsilon_z \quad (1d)$$

From the above equations is shown that a focussing field capable to accelerate ions or electrons towards a predetermined orbit from all directions simultaneously is impossible. Therefore the focussing system proposed herein is based in a new principle, namely:

If, along a predetermined orbit of ions or electrons an electrostatic or electromagnetic field is produced by means of suitably arranged conductors (connected to a high voltage source or energized by high intensity current) exerting on the moving, along said orbit, particles (ions or electrons) forces directed normally to said orbit and varying periodically, in direction and magnitude along said orbit, and increasing in magnitude as the distance from said orbit increases, then the mean value of the focussing forces is negative (directed towards the orbit) and the particles are focussed towards the orbit from all directions.

The focusing forces acting on the particles resulting from the field which is produced electrostatically or electromagnetically, increase as the distance from the orbit increases. The particles move at some finite distance from the orbit and in a direction substantially parallel to the orbit by virtue of the periodically varying exciting focusing forces due to the field. The particles undergo forced oscillations and are subject to the alternately converging and diverging forces from the field. The electrically produced force field, electromagnetic or electrostatic, imposed upon the orbit and the path of the particles exerts forces on the particles within a plane whose normal is substantially parallel to the velocity vector of each of the particles. The path of the particles becomes concave towards the orbit in a converging section and convex towards the orbit in the diverging section. Since the forces are greater as the distance from the orbit becomes greater, the mean value of the converging and diverging forces along the converging section is greater than the mean value of the forces along the diverging section. The resultant force and net effect of the mean value of these alternating forces causes the particles in the path to be forced towards the orbit from all directions and focusing is thereby obtained.

In a focussing system based upon this principle the $x, y, z$, components of the focussing forces are $$P_x=0 \quad (2)$$

$$P_y=-\epsilon\cdot y\cdot \sin\frac{2\pi x}{\lambda} \quad (2a)$$

$$P_z=\epsilon\cdot z\cdot \sin\frac{2\pi x}{\lambda} \quad (2b)$$

As it is obvious $$\Delta\varphi=\frac{\delta P_x}{\delta x}+\frac{\delta P_y}{\delta y}+\frac{\delta P_z}{\delta z}=0$$

$$\epsilon_y=-\epsilon_z \quad (1d)$$

so that the Laplace equation is satisfied and therefore the production of such a field is possible. If we consider a particle moving parallel to the $x$-axis and at a distance $z=z_0$, $y=0$ the force exerted on said particle is $$P_z=e\cdot\epsilon\cdot z_0 \sin\cdot\frac{2\pi x}{\lambda} \quad (3)$$

As the force $P_z$ varies periodically as the particle moves along the $x$-axis, said particle undergoes forced oscillations of frequency $$f=\frac{\beta c}{\lambda} \quad (4)$$

where $\beta c$ the velocity of the particle.

The result of these oscillations is that the distance from the orbit oscillates around the mean value $z_0$ according to the equation $$z=z_0\left(1-\mu \sin\frac{2\pi x}{\lambda}\right) \quad (5)$$

where $$0<\mu<1 \quad (6)$$

In the region where $$\sin\frac{2\pi x}{\lambda}$$

is negative the mean value of the distance from the orbit is greater than $z_0$ while in the region where $$\sin\frac{2\pi x}{\lambda}$$

is positive the mean value of the distance is less than $z_0$, so that the mean value of the force in the first region is greater than the mean value in the second region, with the result that the mean value of the force in a length $\lambda$ is negative, focussing the particle towards the $x$-axis, from all directions.

If the maximum value of the force is $$P_{max}=e\cdot\epsilon\cdot z_0 \quad (7)$$

then the mean value $P_m$ is $$P_m=e\cdot\epsilon_m\cdot z_0 \quad (8)$$

where $$\epsilon_m=\epsilon\cdot\frac{\mu}{2} \quad (9)$$

and $$\mu=\frac{\epsilon\lambda^2}{4\pi^2\beta^2 V} \quad (10)$$

where $\epsilon$ is expressed in volts/cm.$^2$, $\lambda$ in cm., V the total voltage of the particle in volts.

From the above investigation it was found that a focussing system based on the new principle fulfills the requirements of the ideal focusing system in that it focuses the particles from all directions towards a predetermined orbit and the focusing force increases as the distance from said orbit increases.

This new principle can be applied in different ways either electrostatically or electromagnetically.

In particle accelerators where the particles are guided in circular orbit of constant radius by a time varying magnetic field the new focusing principle is effected by properly shaping the magnetic poles between which the guide field is produced.

In linear accelerators the new focusing principle is effected by means of suitable conductors surrounding helically the orbit and connected either to a high voltage source or energized by a high intensity current, as it is explained later on in the present description.

The invention together with further objects and advantages thereof may best be understood by reference to the following description taken in connection with the accompanying drawings in which:

Fig. 1 is a plan view of a circular orbit particle accelerator (synchrotron-type).

Fig. 2 is a section taken on line 1—1′, or line 5—5′ or line 7—7′ of Fig. 1.

Fig. 5 is an enlargement with more details of Fig. 2.

Fig. 6 is a schematic representation illustrating diagrammatically one mode of energization of a set of conductors producing an auxiliary magnetic field during injection of the particles in the evacuated chamber.

As it is mentioned above, the new principle is applied in particle accelerators where the particles are guided in a circular orbit of constant radius by means of a time varying magnetic field, by properly shaping the magnetic poles between which the guide field is produced.

Figs. 11, 11*a*, 11*b*, 11*c* and 11*d* illustrate diagrammatically, with appropriate legends the focusing forces acting upon the particles to maintain them in the predetermined orbit.

The above indicated focusing forces which are exerted upon the particles to maintain them in the orbit can be visualized by referring to the diagrammatic illustration of the focusing forces acting upon the oscillating particles and as shown in Figs. 11, 11*a*, 11*b*, 11*c* and 11*d*.

Figure 11A:
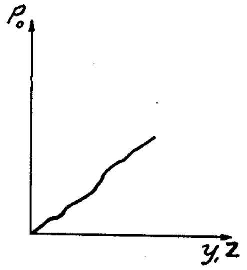
Figure 11:
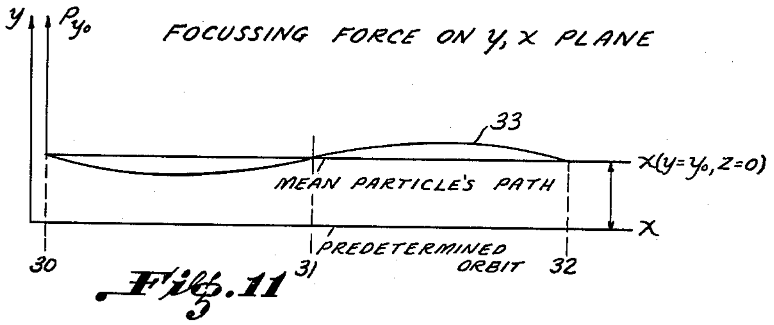
Figure 11B:
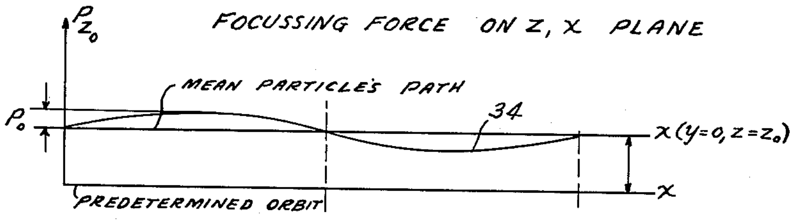

In Fig. 11 the $x$ axis represents the predetermined orbit of the particles. In the $y,x$ plane the electromagnetic forces or electrostatic focusing forces are represented by curve 33. These forces diverge in section 30, 31 of curve 33 and these forces converge in section 31, 32 of curve 33. In Fig. 11*b*, the focusing forces are represented by curve 34 and these forces are taken in the $z,x$ plane. The corresponding section from the dotted line in Fig. 11*b* provides the converging forces in section 30, 31 and the diverging forces in 31, 32. The maximum value of these forces in the converging section 30, 31 of Fig. 11*b* is $P_0$. This maximum value, $P_0$, increases as the distance $y,z$ increases from the $x$ axis and this increase of $P_0$ shown in Fig. 11*b* is shown with relation to the $y,z$ distance in Fig. 11*a*. Thus, for the diverging section illustrated in the $y,x$ plane in Fig. 11, a corresponding converging section is had in the $z,x$ plane and as shown in Fig. 11*b*.

Figure 11C:
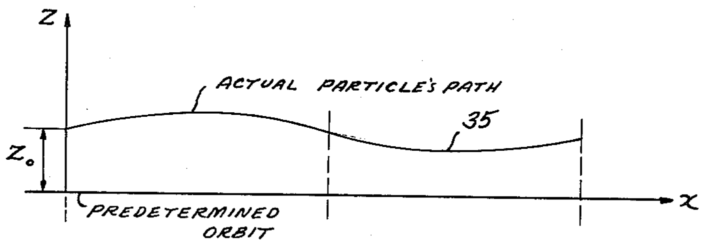
Figure 11D:
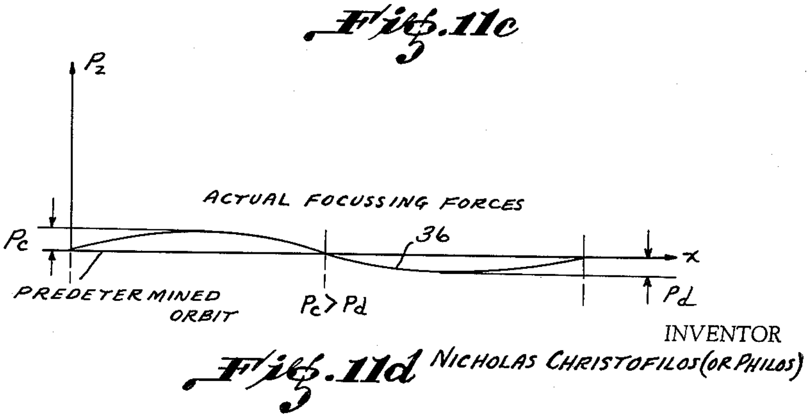

The particles which move along the orbit, move in a path 35 which path extends in a parallel manner to the $x$ axis at the distance $z_0$ as is shown in Fig. 11*c*. The path 35 of the particle with its alternating converging and diverging sections is due to the alternating converging and diverging forces exerted on the particle as it moves through section 30, 31 and section 31, 32. Thus the orbit is concave towards the $x$ axis in section 30, 31 and convex towards the $x$ axis at section 31, 32. The mean distance from the $x$ axis is thus greater in section 30, 31 than in section 31, 32. These forces which focus the particle along the predetermined orbit, $P_0$ in the $y,z$ plane as shown in Fig. 11*a*, $P_c$ in the converging section of Fig. 11*d* and $P_d$ in the diverging section of Fig. 11*d*, while the particle is moving along the $x$ axis, results in a mean value of $P_c$, in the converging section which is greater than $P_d$ in the diverging section. The resultant effect of these forces where $P_c$ is greater than $P_d$ is to provide a resultant converging force to focus the particle towards the $x$ axis.

In Figs. 1, 2, 3, 4, 5 a schematic representation of such an apparatus is illustrated.

The annular evacuated chamber 10 of radius $R_0$ is surrounded by the magnet 12 while the pole pieces 11, 11′ are so shaped so that the intensity H of the magnetic field varies, in the region of the orbit 13, as a function of radius R and azimuthial angle $\theta$ according to the equation $$H=H_0\left[1-\left(1-\frac{R}{R_0}\right)K\cdot\sin(n\theta)\right] \tag{11}$$

and $$n=\sqrt{\frac{K}{\mu}} \tag{11a}$$

where $H_0$ is the intensity of the magnetic field at the orbit 13 of radius $R_0$, K is a positive number and $\mu$ is a coefficient between 0 and 1.

The focusing force is proportional to the $$\frac{\delta H}{\delta R}$$

namely $$P\propto\frac{\delta H}{\delta R}=\frac{H_0\cdot K}{R_0}\sin(n\theta) \tag{11b}$$

In the regions where $\sin(n\theta)$ is positive the magnetic field is radially increasing and in the regions where $\sin(n\theta)$ is negative the magnetic field is radially decreasing while K is not limited between 0 and 1 as in the well known focusing system proposed by Dr. Kerst. In the path of the particles taken on the meridian plane, a convex sector of the path towards the equilibrium orbit is had due to the radially decreasing field in this sector and in the immediate adjacent sector the path of the particles is concave with respect to the equilibrium orbit due to the radial increase of the field acting on the particles in this sector. The mean distance from the equilibrium orbit is greater in the converging sectors than in the diverging sectors. Due to the fact that the forces increase with increasing distance from the equilibrium orbit, a resultant force acts on the particles to bring them towards the equilibrium orbit and this focusing force which results provides greater restoring force in the concave sectors.

Figure 1:
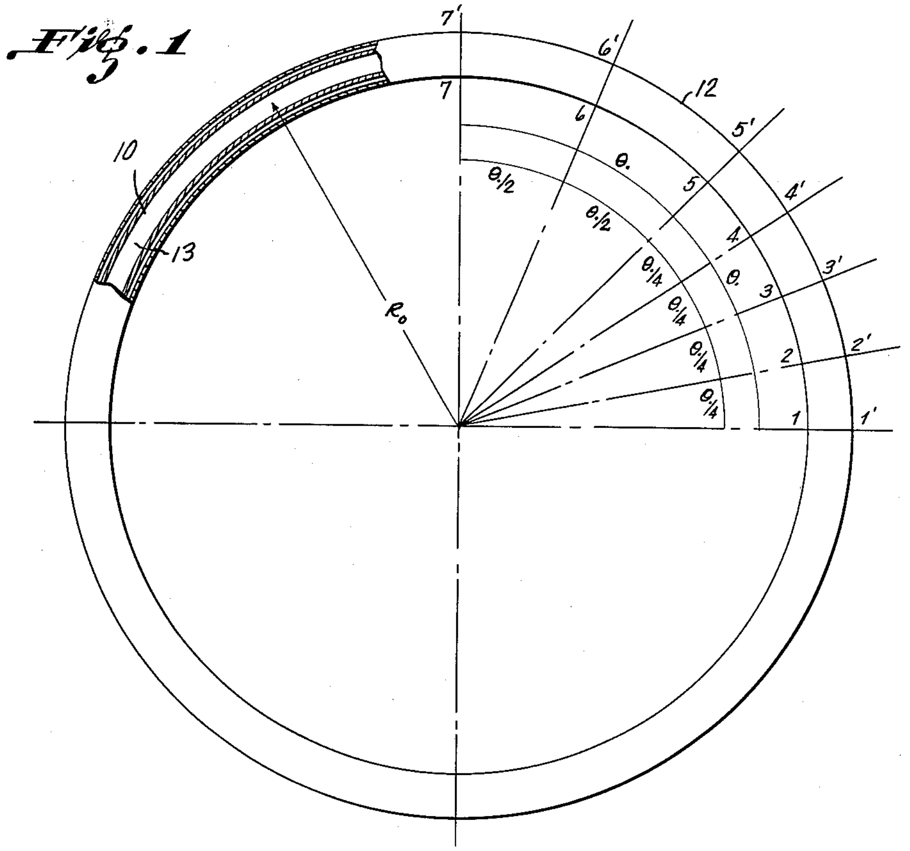
Figure 2:
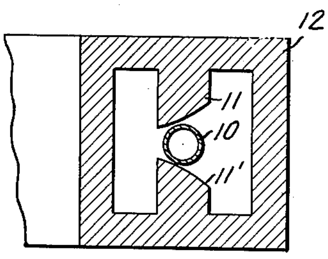
Figure 3:
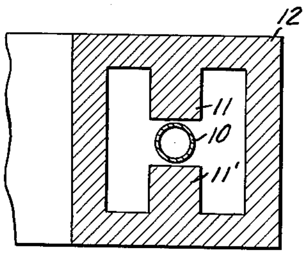
Fig. 3 is a section taken on line 2—2′ or line 4—4′ of Fig. 1.
Figure 4:
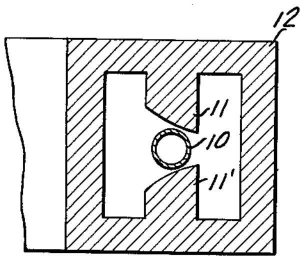
Fig. 4 is a section taken on line 3—3′ or line 6—6′ of Fig. 1.

Fig. 2 and Fig. 5 are sections of the magnet where $\sin(n\theta)=-1$. Fig. 3 is a section where $\sin(n\theta)=0$, and Fig. 4 is a section where $\sin(n\theta)=1$.

The $z$ component (Fig. 5) or vertical component of the focussing force is $$P_z=-z\cdot e\cdot\frac{\beta^2 V}{R_0^2}K\cdot\sin(n\theta) \tag{12}$$

and the radial or $y$ component $$P_y = ye\cdot\frac{\beta^2 V}{R_0^2}K\cdot\sin(n\theta) \qquad (12a)$$

and the mean values are $$P_z = -ez\left[K_d\cdot\frac{\beta^2 V}{R_0^2}\right] \qquad (13)$$

and $$P_y = -ey\left[(K_d+1)\frac{\beta^2 V}{R_0^2}\right] \qquad (13a)$$

where $$K_d = \frac{\mu}{2}K \qquad (14)$$

or $$K_d = \frac{K^2}{2n^2} \qquad (15)$$

$\mu$ is the relative amplitude of the forced oscillation generated on the particle by the alternating focussing force. From the investigation of the equations of motion of the particles under the influence of the alternating focussing forces it is concluded that the relative amplitude should not be greater than 0.4. Therefore $$K_d \leqslant 0.2K \qquad (16)$$

The charge density of the particles is $$P = 1.11\cdot\frac{(2K_d+1)}{4\pi(1-\beta^2)}\cdot\frac{\beta^2 V}{R_0^2}\cdot 10^{-6}\mu \text{ Coul/cm.}^3 \qquad (17)$$

The value of K depends on the dimensions of the evacuated chamber (in cross-section) being inversely proportional of these dimensions and also is proportional to the orbit radius. If we consider that Fig. 5 is a cross-section in scale 1:5 of an apparatus with a radius orbit $R_0$=3000 cm. then the value of $K$=250. With a maximum intensity of the magnetic field at the orbit $H_{max}$=8000 gauss this apparatus can accelerate protons up to 6 Bev. The value of $K_d$ (considering that $n$=25 and $\mu$=0.40)

$$K_d = \frac{K^2}{2n^2} = 50$$

In comparison with the known focussing system where $0<K<1$, with the new system a charge density about hundred times greater can be obtained.

The value of the focussing forces is also increased about 100 times while the amplitude of the phase oscillation (in case of synchrotron principle operation) is reduced in about one tenth. Therefore an apparatus provided with the new system would have smaller magnet weight and smaller cost.

The frequency of the "free" vertical or $z$ oscillation of a particle scattered from the orbit is $$\omega_z = \omega_0 K_d^{1/2} \qquad (18)$$

and the frequency of the radial free oscillation $$\omega_y = \omega_0 (K_d+1)^{1/2} \qquad (18a)$$

where $\omega_0$ is the rotational frequency of the particles. From Equations 18 and 18$a$ results that the two frequencies are very close to each other so that a danger of interaction between them exists as higher harmonics are nearly commensurable. To avoid this danger the apparatus is provided with a set of conductors 14, 14', 15, 15', energized by a high intensity current, by means of which an auxiliary magnetic field is produced with the result that the horizontal or radial component of the focussing force is increased while the vertical one is decreased or vice-versa. Therefore the ratio $\omega_z/\omega_y$ is different from unity and interaction owing to commensurability is not possible. The conductors 14, 14', 15, 15', surround the evacuated chamber along its whole length being parallel to the orbit. The direction of the current in conductors 14, 14', is opposite of the direction in conductors 15, 15', the intensity of the current passing through these conductors, must vary during acceleration almost linearly with the intensity of the magnetic field at the orbit.

During injection the high frequency accelerating field is out of operation and the variation of the radius of the equilibrium orbit is $$\delta R = -R_0\frac{H''}{H_0}\cdot\frac{1}{(1+K_d)}\cdot\frac{2\pi R_0}{\beta_c}\text{ cm./per revolution} \qquad (18)$$

where H'' the rate of variation of the intensity of the magnetic field at the orbit in gauss/sec. $H_0$ the intensity of the magnetic field at the orbit of radius $R_0$, and $\beta c$ the velocity of the particles. In the above mentioned apparatus where $R_0$=3000 cm., $\beta c$=2.7·10⁹ cm./sec., $H_0$=100 gauss and $H_0$=8000 gauss/sec., $K_d$=50 the value of $$\delta R = -0.035 \text{ cm./per rev.}$$

owing to the small value of δR the most of the injected particles would strike the injector after one revolution, for the injector diameter, obviously, would have greater dimensions than 0.035 cm.

Therefore, it is necessary to increase the rate of variation of the intensity of the magnetic field during injection, by means of an auxiliary magnetic field.

This is effected by means of a set of 4 conductors 16, 16', 17, 17', placed around the evacuated chamber 10, as it is shown in Fig. 5. These conductors are connected to a condenser 20 (Fig. 6) through a resistor 18 and a thyratron tube 19. The thyratron tube is energized a few microseconds before injection and the condenser 20 is discharged through resistor 18 and the conductors 16, 16', 17, 17'.

The current intensity through these conductors is $$\tau = \tau_{max}\cdot\left[1-exp\left(-\frac{t\cdot R_s}{L_s}\right)\right] \qquad (19)$$

where $R_s$ the resistance of the circuit (including the resistance of the thyratron tube which at the moment of energization is not negligible). $L_s$ the self-inductance of the circuit and $\tau_{max}=\epsilon_s/R_s$ where $\epsilon_s$ the voltage of the condenser 20.

The rate of variation of the intensity of the magnetic field is $$H'' = H''_0 + H''_s$$

where $H''_0$ the rate of variation of the intensity of the main field and $H''_s$ the rate of variation of the intensity of the auxiliary magnetic field $$H_s'' = \alpha\cdot\frac{\epsilon_s}{L_s}exp\cdot\left(-\frac{t\cdot R_s}{L_s}\right) \qquad (20)$$

where $\alpha$ is a constant depending on the mutual distance of the conductors 16, 16', 17, 17'.

At the coil 21' (Fig. 6) an E. M. F. is induced, being proportional to $H''_s$. By means of this E. M. F. and a suitable electronic circuit, the injector is energized so that the injection starts as $H''_s$ reaches a predetermined value.

To avoid radial oscillations on the injected particles, the injector must be placed in the inner side (which has the smaller radius) of the evacuated chamber. In this case the intensity of the magnetic field should rapidly decrease during injection so that the radius of the already injected particles continuously increases. The energy of the injected particles should continuously decrease during the injection so that the equilibrium orbit lies at the injector at the very moment of injection. In order to obtain an equilibrium orbit of constant radius at the very moment of the injection, the energy of the particles produced by the injector must decrease during the time of one revolution to the rate $$\delta V = 2\pi R_0^2\cdot H''\cdot 10^{-8}\text{ volts} \qquad (21)$$

By this way of injection, the injected particles have always their equilibrium orbit at the injector at the very moment of their injection while after their injection are spiralling outwards, not striking the injector in their next revolutions.

The time constant $L_s/R_s$ should be greater than the duration of injection, while the capacity C of the condenser 20 is $$c \geq \frac{H_s''}{H_o''} \cdot \frac{L_s}{R_s^2} \qquad (22)$$

The condenser 20 is charged by a D. C. source through the resistor 22.

Hereafter two other ways of application of the new focussing principle are described. In both cases around the particle orbit (straight or curved) a group of conductors is suitably arranged, which are connected either to a high voltage source so that the particles are focussed by means of the produced electrostatic field, or are energized by a high intensity current so that the particles are focussed by means of the produced electromagnetic field.

Figure 7:
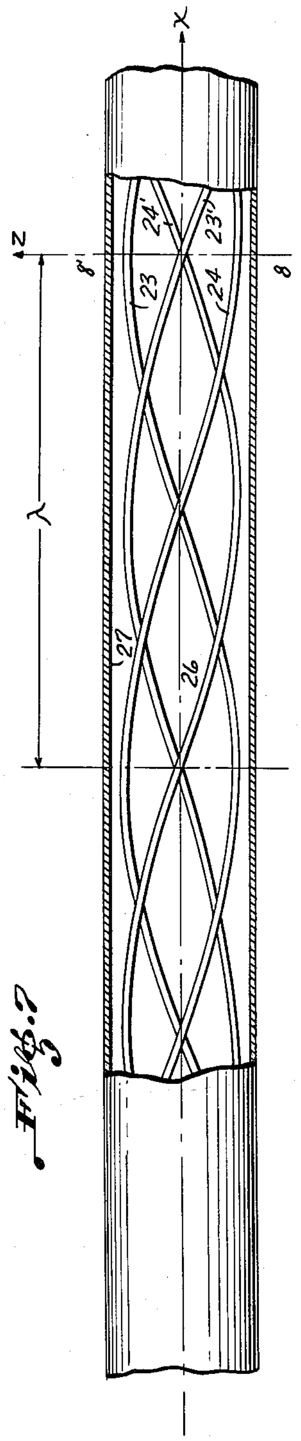
Fig. 7 is a schematic representation of the conductors arrangement inside the evacuated chamber by means of which an electrostatic field is produced having the focusing properties of the new focusing principle.
Figure 10:
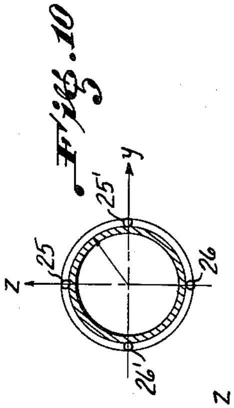
Fig. 10 is a section taken on line 9—9′ of Fig. 9.
Figure 8:
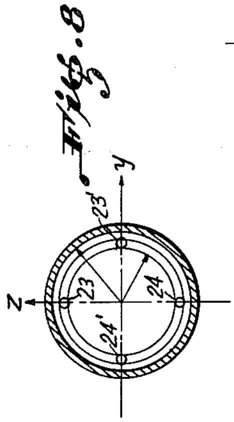
Fig. 8 is a section taken on line 8—8′ of Fig. 7.
Figure 9:
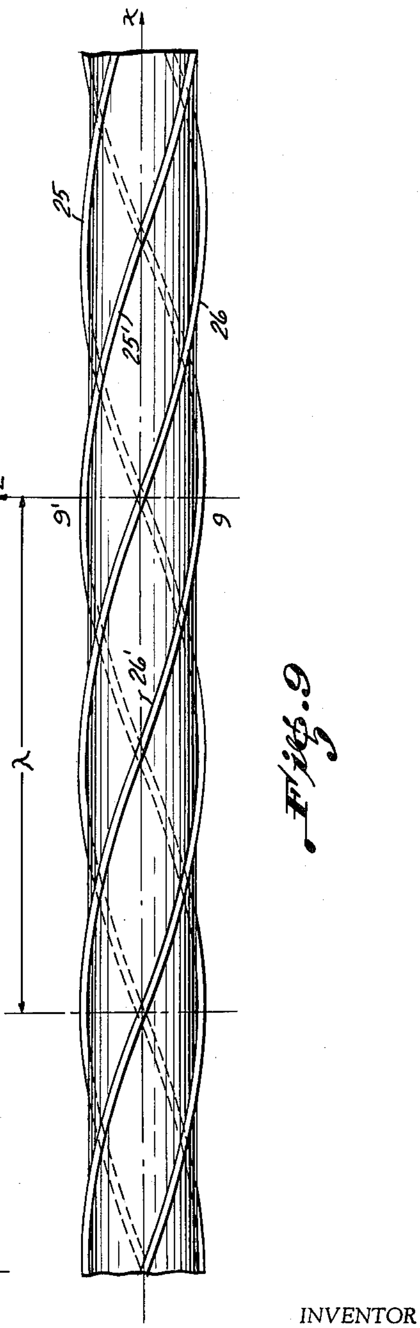
Fig. 9 is a schematic representation of the conductors arrangement around the evacuated chamber, by means of which an electromagnetic field is produced having the focusing properties of the above explained focusing principle.

In Figs. 7 and 8 the arrangement of the conductors inside a vacuum tube is shown for the case of electrostatic focussing and in Figs. 9 and 10 the arrangement of the conductors outside the vacuum tube, is shown for the case of electromagnetic focussing.

In both cases there are four conductors surrounding helically the orbit. The geometric position of the four conductors relative to the orbit are determinated from the following equations in orthogonal coordinates $x$, $y$, $z$ where it is assumed that the $x$-axis coincides with the particles orbit.

for conductor 23 (Figs. 7, 8)

$$x = \frac{\lambda}{\pi} \cdot \varphi \qquad (23)$$

and conductor 25 (Figs. 9, 10)

$$y = v_0 \sin \varphi \qquad (23a)$$

$$z = v_0 \cos \varphi \qquad (23b)$$

for conductor 23' (Figs. 7, 8)

$$x = \frac{\lambda}{\pi} \cdot \varphi \qquad (23)$$

and conductor 25' (Figs. 9, 10)

$$y = v_0 \cos \varphi \qquad (24)$$

$$z = -v_0 \sin \varphi \qquad (24a)$$

for conductor 24 (Figs. 7, 8)

$$x = \frac{\lambda}{\pi} \cdot \varphi \qquad (23)$$

and conductor 26 (Figs. 9, 10)

$$y = -v_0 \sin \varphi \qquad (25)$$

$$z = -v_0 \cos \varphi \qquad (25a)$$

for conductor 24' (Figs. 7, 8)

$$x = \frac{\lambda}{\pi} \cdot \varphi \qquad (23)$$

and conductor 26' (Figs. 9, 10)

$$y = -v_0 \cos \varphi \qquad (26)$$

$$z = v_0 \sin \varphi \qquad (26a)$$

where the angle $\varphi$ is the parameter.

The conductors 23, 24 are connected to the positive pole of a high voltage source, while the negative pole is connected to the inner metallized surface 27 of the vacuum tube.

The conductors 23', 24', are connected to the negative pole of another source of equal voltage, while the positive pole of the second source is connected to the inner metallized surface 27 of the vacuum tube.

On a particle moving at a distance $r$ from the orbit a focussing force is exerted:

$$P = e \cdot r \cdot \epsilon \cdot \sin 2\varphi \qquad (27)$$

where $$\varphi = \frac{\pi x}{\lambda} \qquad (27a)$$

And the mean value of the force is $$P_m = -e \cdot r \cdot \epsilon_m \qquad (28)$$

where $$\pi_m = \epsilon \cdot \frac{\mu}{2} \qquad (28a)$$

where $\mu$ is the relative amplitude of the forced oscillation exerted on the particle by the alternating force P. The value of $\mu$ is $$\mu = \frac{\epsilon \lambda^2}{4\pi^2 \beta^2 V} \qquad (10)$$

and $$\epsilon = \alpha \cdot \frac{4U}{V_0^2} \text{ volts/cm.}^2 \qquad (29)$$

where $\alpha$ is a coefficient of the order of unity depending on the geometric proportions of the radius of the conductors and the vacuum tube and U the voltage of said conductors relatively to the metallized surface of the vacuum tube.

The two conductors 23, 24 or the conductors 23', 24', can be omitted to simplify the system, but in this case the coefficient $\alpha$ is decreased to the half of its value in the four conductor system.

The charge density of the moving, through this tystem of conductors, particles is $$P = 1.11 \cdot \frac{\epsilon}{2\pi(1-\beta^2)} \cdot 10^{-6} \mu \text{ Coul/cm.}^3 \qquad (30)$$

In Figs. 9, 10, the arrangement of the four conductors is shown for the case of electromagnetic focussing.

In this case the four conductors 25, 26, 25', 26', are energized by a high intensity current instead of being connected to a high voltage source. The geometric position of the conductors is given by the Equations 23–26$a$ and the current direction in conductor 25, 26 is opposite as in the conductors 25', 26'.

If $\tau$ is the current intensity through one conductor the coefficient $\epsilon$ expressed in volts/cm.$^2$ is $$\epsilon = \frac{240\tau}{V_0^2} \cdot \beta \text{ volts/cm.}^2 \qquad (31)$$

The wave length $\lambda_f$ of the "free" oscillation of a particle scattered from the orbit is $$\lambda_f = \lambda \cdot \frac{\sqrt{2}}{\mu} \qquad (32)$$

where $$\mu = \frac{\epsilon \lambda^2}{4\pi^2 \beta^2 V} \qquad (10)$$

Equation 32 is correct for small values of $\mu (< 0.2)$. For greater values the wavelength is somewhat smaller than the value given from Equation 32.

These two ways of electrostatic and electromagnetic focussing are more suitable for linear accelerators but can be combined with the first described way in order to increase the intensity of the focussing forces. The application of the described focussing system is not limited only to particle accelerators but numerous other applications are possible. For example, a possible application is in the long distance energy transmission, where in lieu of transmission lines, vacuum tubes can be used provided with the new focussing system. Then high energy electrons and in great quantity can be guided inside such tubes. For example an electron beam of 50 mev. and intensity of 10 amp. can be transmitted inside a $10^{-8}$ at. vacuum tube of an inch diameter at a distance of a few thousand miles with only 1–2% losses. Another possible application of the new focussing system is the construction of H. V. transformers where the H. V. coil would be constructed, instead of metal conductor, of a vacuum tube provided with the new system inside of which electrons would be continously accelerated.

While the invention has been described by reference to particular embodiments it will be understood that numerous modifications may be made by those skilled in the art without actually departing from the invention.

The appended claims therefore are designed to cover all such equivalent variations as come within the true spirit and scope of the foregoing disclosure.

What I claim as new and desire to secure by Letters Patent of the United States is:

1. In a closed orbit particle accelerator in which the accelerated particle oscillates within a plane whose normal is substantially parallel to the velocity vector of said particle, that improvement comprising a focussing field means which impresses a resultant electrical focussing force on said particle in said plane whose mean value increases as the distance of the particle from the orbit increases, said focussing field means varying said force periodically with respect to direction along said orbit whereby said particle moving in a path substantially parallel to said orbit is subjected to alternately converging and diverging forces and thereby made to describe an oscillatory path which is concave towards said orbit in converging sections and convex towards said orbit in diverging sections thereof, the mean distance of the particle from the orbit being greater in the converging sections than in the diverging sections of said path.

2. In a closed orbit particle accelerator in which the accelerated particle oscillates within a plane whose normal is substantially parallel to the velocity vector of said particle, that improvement comprising a focussing field means which impresses a resultant electrical focussing force on said particle in said plane whose mean value increases as the distance of the particle from the orbit increases, said focussing field means varying said force periodically with respect to direction along said orbit whereby said particle moving in a path substantially parallel to said orbit is subjected to alternately converging and diverging forces and thereby made to describe an oscillatory path which is concave towards said orbit in converging sections and convex towards said orbit in diverging sections thereof, the mean distance of the particle from the orbit being greater in the converging sections than in the diverging sections of said path, said focussing field means comprising orbit magnet pole pieces shaped in such a configuration that the intensity (H) of the magnetic field in the region of said orbit, varies as a function of the radius (R) at the point at which said intensity of the magnetic field is measured and at the azimuthal angle ($\theta$) according to the equation:

$$H=H_0\left[1-\left(1-\frac{R}{R_0}\right)\cdot K\cdot\sin(n\theta)\right]$$

wherein $$n=\sqrt{\frac{K}{\mu}}$$

K is a number equal to the maximum rate of the radial increase of the intensity of the magnetic field, $\mu$ is a positive number between 0 and 0.5, and $H_0$ is the instantaneous intensity of said magnetic field at said orbit of radius $R_0$.

3. In a betatron, that modification of the shape of the guide field pole faces in which the intensity (H) of the magnetic field in the region of said orbit, varies as a function of the radius (R) at the point at which said intensity of the magnetic field is measured and at the azimuthal angle ($\theta$) according to the equation:

$$H=H_0\left[1-\left(1-\frac{R}{R_0}\right)\cdot K\cdot\sin(n\theta)\right]$$

where $$n=\sqrt{\frac{K}{\mu}}$$

K is a number equal to the maximum rate of the radial increase of the intensity of the magnetic field, $\mu$ is a positive number between 0 and 0.5, and $H_0$ is the instantaneous intensity of said magnetic field at said orbit of radius $R_0$.

4. In a closed orbit particle accelerator in which the accelerated particle oscillates within a plane whose normal is substantially parallel to the velocity vector of said particle, that improvement comprising a focussing field means which impresses a resultant electrical focussing force on said particle in said plane whose mean value increases as the distance of the particle from the orbit increases, said focussing field means varying said force periodically with respect to direction along said orbit whereby said particle moving in a path substanitally parallel to said orbit is subjected to alternately converging and diverging forces and thereby made to describe an oscillatory path which is concave towards said orbit in converging sections and convex towards said orbit in diverging sections thereof, the mean distance of the particle from the orbit being greater in the converging sections than in the diverging sections of said path, said focussing field means comprising a helical winding of a group of 4 conductors associated with an annular container surrounding said conductors and said orbit wherein the geometric relation of said conductors relative to said orbit is determined by the formulae:

For Conductor 1:

$$x=\frac{\lambda}{\pi}\varphi$$
$$y=V_0\sin\varphi$$
$$z=V_0\cos\varphi$$

For Conductor 2:

$$x=\frac{\lambda}{\pi}\varphi$$
$$y=V_0\cos\varphi$$
$$z=-V_0\sin\varphi$$

For Conductor 3:

$$x=\frac{\lambda}{\pi}\varphi$$
$$y=-r_0\sin\varphi$$
$$z=-r_0\cos\varphi$$

For Conductor 4:

$$x=\frac{\lambda}{\pi}\varphi$$
$$y=-r_0\cos\varphi$$
$$z=r_0\sin\varphi$$

wherein $x$, $y$ and $z$ are the orthogonal position coordinates defining the conductor position, $r_0$ is the distance of said conductors from said orbit and $\varphi$ is the parameter of the positioning angle of said conductors in orthogonal coordinates, and wherein the $x$ axis coincides with said orbits, the direction of said current exciting said electromagnetic field which passes through conductors 1 and 3 being opposite to the direction of said current which passes through conductors 2 and 4.

5. In a closed orbit particle accelerator in which the accelerated particle oscillates within a plane whose normal is substantially parallel to the velocity vector of said particle, that improvement comprising a focussing field means which impresses a resultant electrical focussing force on said particle in said plane whose mean value increases as the distance of the particle from the orbit increases, said focussing field means varying said force periodically with respect to direction along said orbit whereby said particle moving in a path substantially parallel to said orbit is subjected to alternately converging and diverging forces and thereby made to describe an oscillatory path which is concave towards said orbit in converging sections and convex towards said orbit in diverging sections thereof, the mean distance of the particle from the orbit being greater in the converging sections than in the diverging sections of said path, said focussing field means comprising a helical winding of a group of 2 conductors associated with an annular container surrounding said conductors and said orbit wherein the geometric position of said conductors relative to said orbit is determined by the formulae:

For Conductor 1:

$$x=\frac{\lambda}{\pi}\varphi$$
$$y=r_0 \sin \varphi$$
$$z=r_0 \cos \varphi$$

For Conductor 2:

$$x=\frac{\lambda}{\pi}\varphi$$
$$y=-r_0 \sin \varphi$$
$$z=-r_0 \cos \varphi$$

where $x$, $y$, $z$ are the orthogonal position coordinates defining the conductor position, $r_0$ the distance of said conductors from said orbit, $\varphi$ a parameter and wherein the $x$-axis coincides with said orbit, said conductors energized by a high voltage source providing both conductors with a positive or negative charge relative to said annular container surrounding said conductors, the axis of said annular container coinciding with said orbit.

6. In a closed orbit particle accelerator in which the accelerated particle oscillates within a plane whose normal is substantially parallel to the velocity vector of said particle, that improvement comprising a focussing field means which impresses a resultant electrical focussing force on said particle in said plane whose mean value increases as the distance of the particle from the orbit increases, said focussing field means varying said force periodically with respect to direction along said orbit whereby said particle moving in a path substantially parallel to said orbit is subjected to alternately converging and diverging forces and thereby made to describe an oscillatory path which is concave towards said orbit in converging sections and convex towards said orbit in diverging sections thereof, the mean distance of the particle from the orbit being greater in the converging sections than in the diverging sections of said path, said focussing field means comprising a helical winding of a group of 4 conductors associated with an annular container surrounding said conductors and said orbit wherein the geometric relation of said conductors reltaive to said orbit is determined by the formulae:

For Conductor 1:

$$x=\frac{\lambda}{\pi}\varphi$$
$$y=V_0 \sin \varphi$$
$$z=V_0 \cos \varphi$$

For Conductor 2:

$$x=\frac{\lambda}{\pi}\varphi$$
$$y=V_0 \cos \varphi$$
$$z=-V_0 \sin \varphi$$

For Conductor 3:

$$x=\frac{\lambda}{\pi}\varphi$$
$$y=-V_0 \sin \varphi$$
$$z=-V_0 \cos \varphi$$

For Conductor 4:

$$x=\frac{\lambda}{\pi}\varphi$$
$$y=-V_0 \cos \varphi$$
$$z=V_0 \sin \varphi$$

whereby $x$, $y$ and $z$ are the orthogonal position coordinates defining the conductor position, $r_0$ is the distance of said conductor from said orbit, and $\varphi$ is the parameter of the positioning angle of said conductors in orthogonal coordinates, and wherein the $x$ axis coincides with said orbits, said conductors energized by a high voltage source to provide conductors 1 and 3 with a positive charge and conductors 2 and 4 with negative charge relative to said annular container surrounding said conductors.

7. In a particle accelerator in which the accelerated particle oscillates within a plane whose normal is substantially parallel to the velocity vector of said particle, that improvement comprising a focussing field means which impresses a resultant electrical focussing force on said particle in said plane whose mean value increases as the distance of the particle from the path which is controlled by the accelerator increases, said focussing field means varying said force periodically with respect to direction along the path which is controlled by said accelerator whereby said particle moving in a path substantially parallel to said path controlled by said accelerator is subjected to alternately converging and diverging forces and thereby made to describe an oscillatory path which is concave towards siad path controlled by the accelerator in converging sections and convex towards said path controlled by the accelerator in diverging sections thereof, the means distance of the particle from the path controlled by the accelerator being greater in the converging sections than in the diverging sections of said particle path.

8. A particle accelerator as in claim 7 wherein the path which is controlled by said accelerator is linear.

References Cited in the file of this patent

UNITED STATES PATENTS

| | | |
|---|---|---|
| 1,645,304 | Slepian | Oct. 11, 1927 |
| 1,985,093 | Hehlgans | Dec. 18, 1934 |
| 2,103,303 | Steenbeck | Dec. 28, 1937 |
| 2,193,602 | Penney | Mar. 12, 1940 |
| 2,297,305 | Kerst | Sept. 29, 1942 |
| 2,299,792 | Bouwers | Oct. 27, 1942 |
| 2,355,658 | Lawlor | Aug. 15, 1944 |
| 2,394,070 | Kerst | Feb. 5, 1946 |
| 2,394,072 | Westendorp | Feb. 5, 1946 |
| 2,407,298 | Skellett | Sept. 10, 1946 |
| 2,473,123 | Adams | June 14, 1949 |
| 2,473,477 | Smith | June 14, 1949 |
| 2,480,169 | Westendorp | Aug. 30, 1949 |
| 2,491,345 | Westendorp | Dec. 13, 1949 |
| 2,533,859 | Wideroe | Dec. 12, 1950 |
| 2,572,414 | Wideroe | Oct. 23, 1951 |